(12) United States Patent
Jung et al.

(10) Patent No.: US 7,933,078 B2
(45) Date of Patent: Apr. 26, 2011

(54) SUPER WIDE ANGLE OPTICAL SYSTEM

(75) Inventors: Phil Ho Jung, Gyunggi-do (KR); Moon Do Yi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 12/289,151

(22) Filed: Oct. 21, 2008

(65) Prior Publication Data
US 2009/0251801 A1  Oct. 8, 2009

(30) Foreign Application Priority Data

Apr. 4, 2008  (KR) .................. 10-2008-0031815

(51) Int. Cl.
*G02B 9/62* (2006.01)
*G02B 13/18* (2006.01)
*G02B 13/02* (2006.01)
(52) U.S. Cl. ....................... 359/762; 359/713
(58) Field of Classification Search .................. 359/762, 359/750, 752, 753, 713, 714
See application file for complete search history.

(56) References Cited

U.S. PATENT DOCUMENTS

| 5,477,389 A * | 12/1995 | Ito et al. ........................ 359/752 |
| 6,801,373 B2 * | 10/2004 | Reinecke et al. ............. 359/754 |
| 7,023,628 B1 | 4/2006 | Ning |
| 2008/0074761 A1 | 3/2008 | Yamakawa et al. |

FOREIGN PATENT DOCUMENTS

| DE | 1 014 752 | 8/1957 |
| EP | 1 734 393 A1 | 12/2006 |
| JP | 2006-349920 | 12/2006 |

OTHER PUBLICATIONS

German Office Action issued Jul. 30, 2009 in corresponding German Patent Application 10 2008 052 328.3.
Korean Office Action issued Feb. 19, 2010 in corresponding Korean Patent Application 10-2008-0031815.

* cited by examiner

*Primary Examiner* — Alicia M Harrington

(57) ABSTRACT

There is provided a super wide angle optical system including, arranged about an optical axis: a first lens having a negative refractive power and having a meniscus shape with a convex object-side surface; a second lens having a negative refractive power and having a meniscus shape with a convex object-side surface; a third lens having a positive refractive power and having both convex surfaces; a fourth lens having a positive refractive power; a fifth lens having a negative refractive power; and a sixth lens having a positive refractive power and having both convex surfaces.

5 Claims, 8 Drawing Sheets

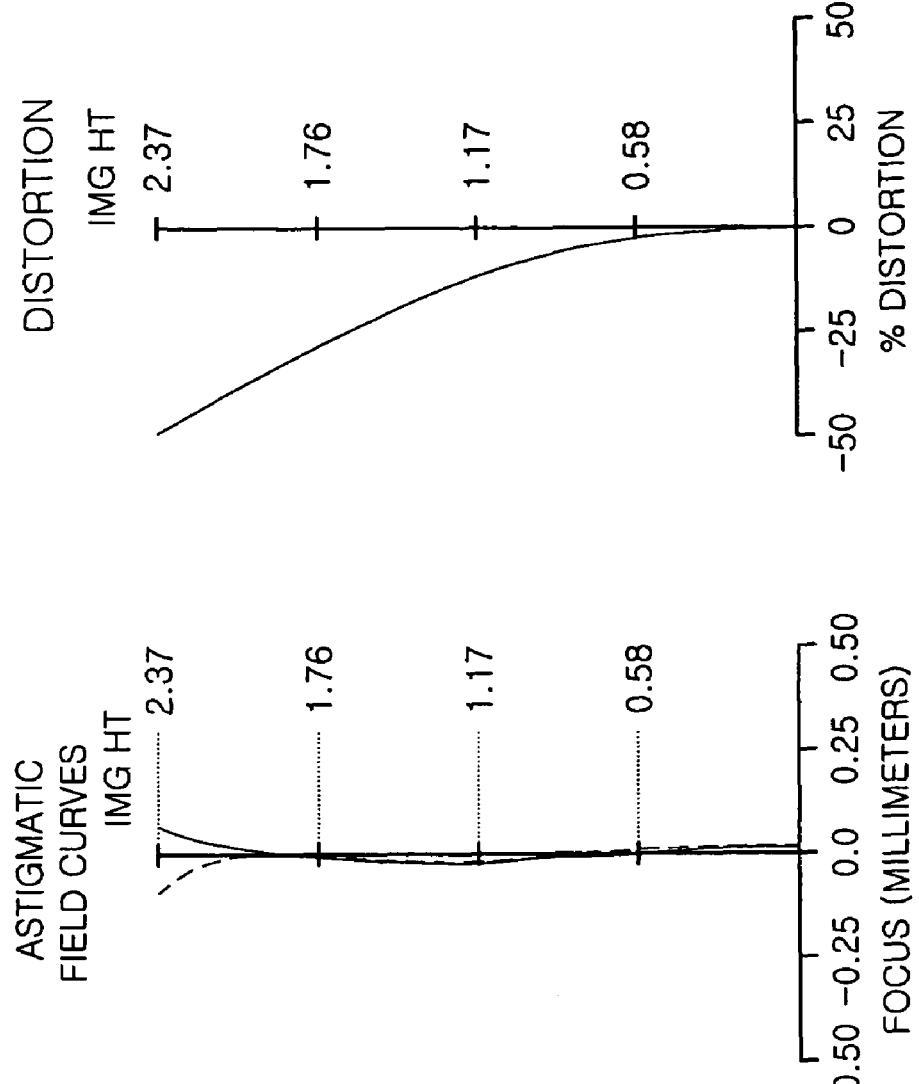
FIG. 8A
FIG. 8B
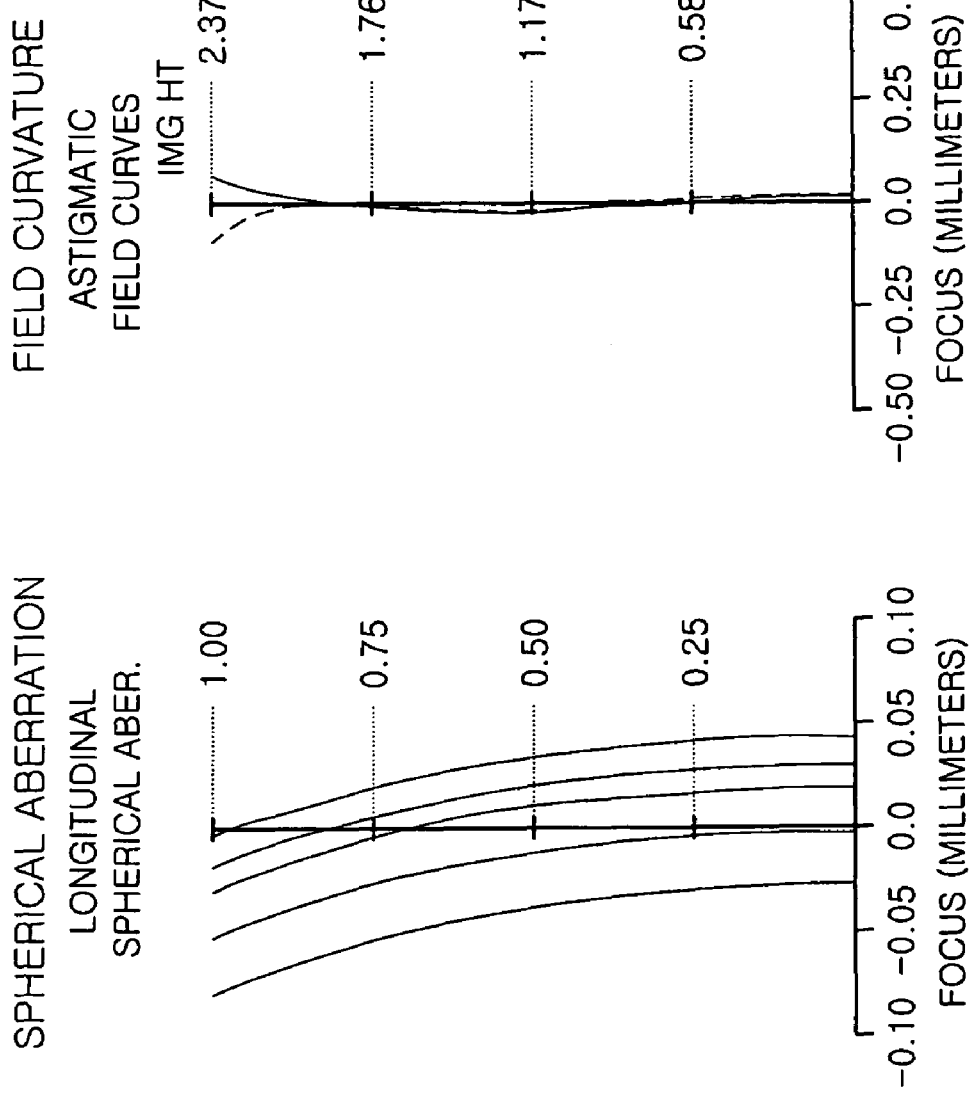
FIG. 8C

SUPER WIDE ANGLE OPTICAL SYSTEM

CROSS-REFERENCE TO RELATED APPLICATIONS

This application claims the priority of Korean Patent Application No. 2008-31815 filed on Apr. 4, 2008, in the Korean Intellectual Property Office, the disclosure of which is incorporated herein by reference.

BACKGROUND OF THE INVENTION

1. Field of the Invention

The present invention relates to a super wide angle optical system, and more particularly, to a super wide angle optical system reduced in size and weight and increased in definition to be employed in cameras for a mobile phone terminal, computer and vehicle while capable of obtaining broad image data.

2. Description of the Related Art

In general, a mobile communication terminal, a computer, a lap top computer and a vehicle have a camera installed therein to display or photograph image data. With slimmer mobile communication terminals or smaller-sized computers or laptops, cameras are required to be reduced in size and weight and exhibit high image quality. Also, vehicle cameras need to be smaller and lighter so as not to obstruct the view of drivers and harm aesthetic appearance.

In addition, such cameras with smaller size and lighter weight and high definition should have a wide angle of view to obtain as broad image data as possible.

However, attempts to maintain a wide angle of view for broad image data while reducing the size of the camera have led to aggravation of distortion of the wide angle lens.

SUMMARY OF THE INVENTION

An aspect of the present invention provides a super wide angle optical system reduced in size and weight and increased in definition and having a wide angle of view appropriate for image devices used in a surveillance camera installed in various electronic devices or a vehicle camera, thereby reducing distortion of an image.

According to an aspect of the present invention, there is provided a super wide angle optical system including, arranged about an optical axis: a first lens having a negative refractive power and having a meniscus shape with a convex object-side surface; a second lens having a negative refractive power and having a meniscus shape with a convex object-side surface; a third lens having a positive refractive power and having both convex surfaces; a fourth lens having a positive refractive power; a fifth lens having a negative refractive power; and a sixth lens having a positive refractive power and having both convex surfaces.

Each of the lenses may satisfy following condition 1:

$$1: 3.5 < \theta d/TL < 8.0 \quad \text{condition 1,}$$

where $\theta d$ is a maximum half angle of view of the optical system and TL is a distance from an object-side surface of a lens closest to the object side to an image plane.

The fourth and fifth lenses may form one lens group, the fourth and fifth lenses cemented together or spaced apart from each other at a predetermined distance.

The super wide angle optical system may further include an aperture stop disposed between the third and fourth lenses to adjust light amount.

At least one of the first and second lenses may have at least one surface formed of an aspherical surface.

The sixth lens may have at least one of both surfaces formed of an aspherical surface.

Each of the lenses may satisfy following condition 2:

$$2: 0.35 < Yd/(f^* \tan \theta d) < 0.60 \quad \text{condition 2,}$$

where $Yd$ is a maximum height of image, $f$ is a focal length of the optical system, and $\theta d$ is a maximum half angle of view of the optical system.

Each of the lenses may satisfy following condition 3:

$$3: -2.10 < fp/fm < -0.70 \quad \text{condition 3,}$$

where $fp$ is a focal length of a lens having an aspherical surface and a positive refractive power, and $fm$ is a focal length of a lens having an aspherical surface and a negative refractive power.

Each of the lenses may satisfy following condition 4:

$$4: 2.0 < ff/fs < 3.8 \quad \text{condition 4,}$$

where $ff$ is a focal length of the lens disposed closest to an object side and $fs$ is a focal length of the lens disposed closest to an image side of the lens disposed closest to the object side.

Each of the lenses may satisfy following condition 5:

$$5: -5.0 < fr/Rr < -0.9 \quad \text{condition 5,}$$

where $fr$ is a focal length of the lens disposed closest to an image side and $Rr$ is a radius of curvature of an image-side surface of the lens disposed closest to the image side.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A to 2C are aberrational diagrams illustrating the embodiment shown in FIG. 1, in which FIG. 2A represents spherical aberration, FIG. 2B represents astigmatism and FIG. 2C represents distortion;

FIGS. 4A to 4C are aberrational diagrams illustrating the embodiment shown in FIG. 3, in which FIG. 4A represents spherical aberration, FIG. 4B represents astigmatism and FIG. 4C represents distortion;

FIGS. 6A to 6C are aberration diagrams illustrating the embodiment shown in FIG. 5, in which FIG. 6A represents spherical aberration, FIG. 6B represents astigmatism and FIG. 6C represents distortion;

FIGS. 8A to 8C are aberration diagrams illustrating the embodiment shown in FIG. 7, in which FIG. 8A represents spherical aberration, FIG. 8B represents astigmatism and FIG. 8C represents distortion.

DETAILED DESCRIPTION OF THE PREFERRED EMBODIMENT

Figure 1:
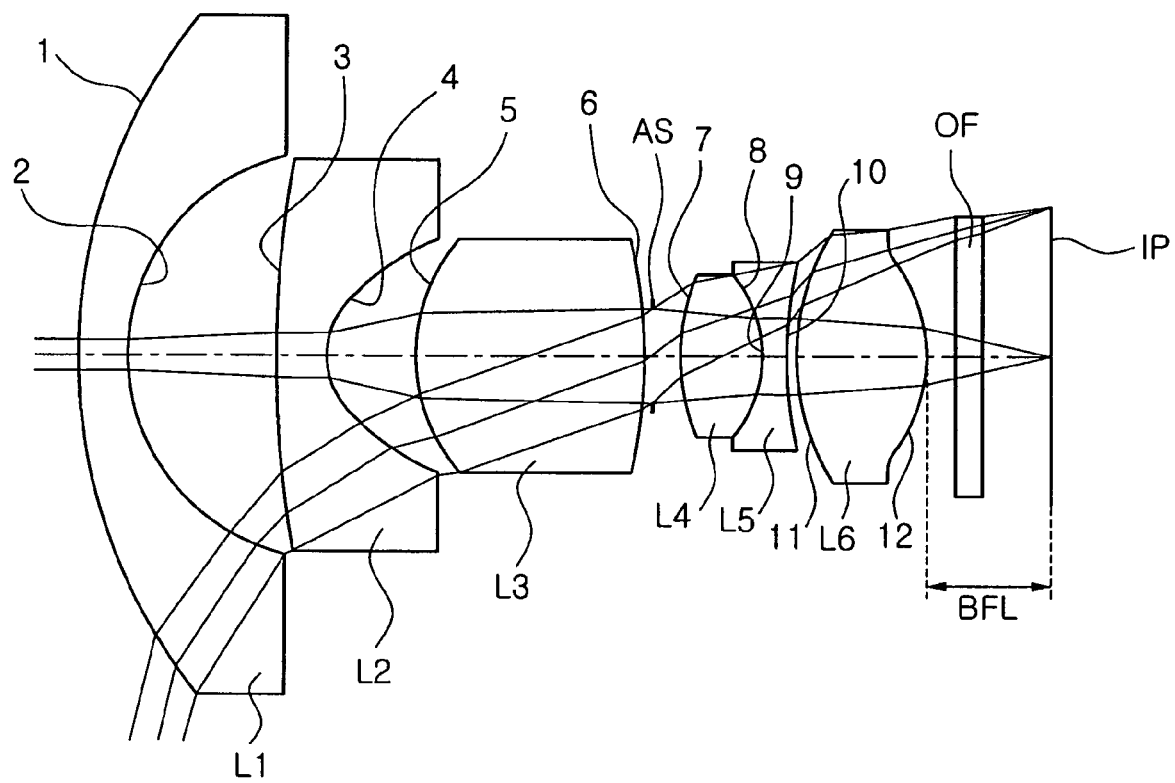
FIG. 1 is a lens configuration view illustrating a super wide angle optical system according to a first embodiment of the invention.

Exemplary embodiments of the present invention will now be described in detail with reference to the accompanying drawings.

Hereinafter, a super wide optical system will be described with reference to FIGS. 1, 3, 5 and 7. FIGS. 1, 3, 5 and 7 schematically illustrate first to fourth embodiments of the present invention.

In the following lens configuration views, the thicknesses, sizes and shapes of the lenses may be exaggerated for clarity. In particular, the shapes of spherical or aspherical surfaces shown in the views are only exemplary and should not be construed as limiting.

As shown, the super wide angle optical system according to each of the embodiments includes, sequentially from an object side, a first lens L1, a second lens L2, a third lens L3, a fourth lens L4, a fifth lens L5 and a sixth lens L6.

An optical filter OF such as an infrared filter and a cover glass may be disposed between the sixth lens 6 and the imaging plane IP. This optical filter OF is construed not to fundamentally affect optical capabilities.

The first lens L1 has a negative refractive power and may have a meniscus shape with a convex object-side. The object-side surface 1 of the first lens L1 may have a radius of curvature greater than a radius of curvature of an image-side surface 2.

The second lens L2 has a negative refractive power and may have a meniscus shape with a convex object-side. The object-side surface 3 of the second lens L2 may have a radius of curvature greater than a radius of curvature of an image-side surface 4, but not limited thereto. When predetermined conditions to be described later are met, the object-side surface 3 of the second lens L2 may have a radius of curvature smaller than a radius of curvature of the image-side surface 4.

The third lens L3 may have a positive refractive power, and may have a convex object-side surface 5 and a convex image-side surface 6.

The object-side surface 5 of the third lens L3 may have a radius of curvature greater or smaller than the image-side surface 6 of the third lens L3 as long as satisfying predetermined conditions which will be described later.

Figure 3:
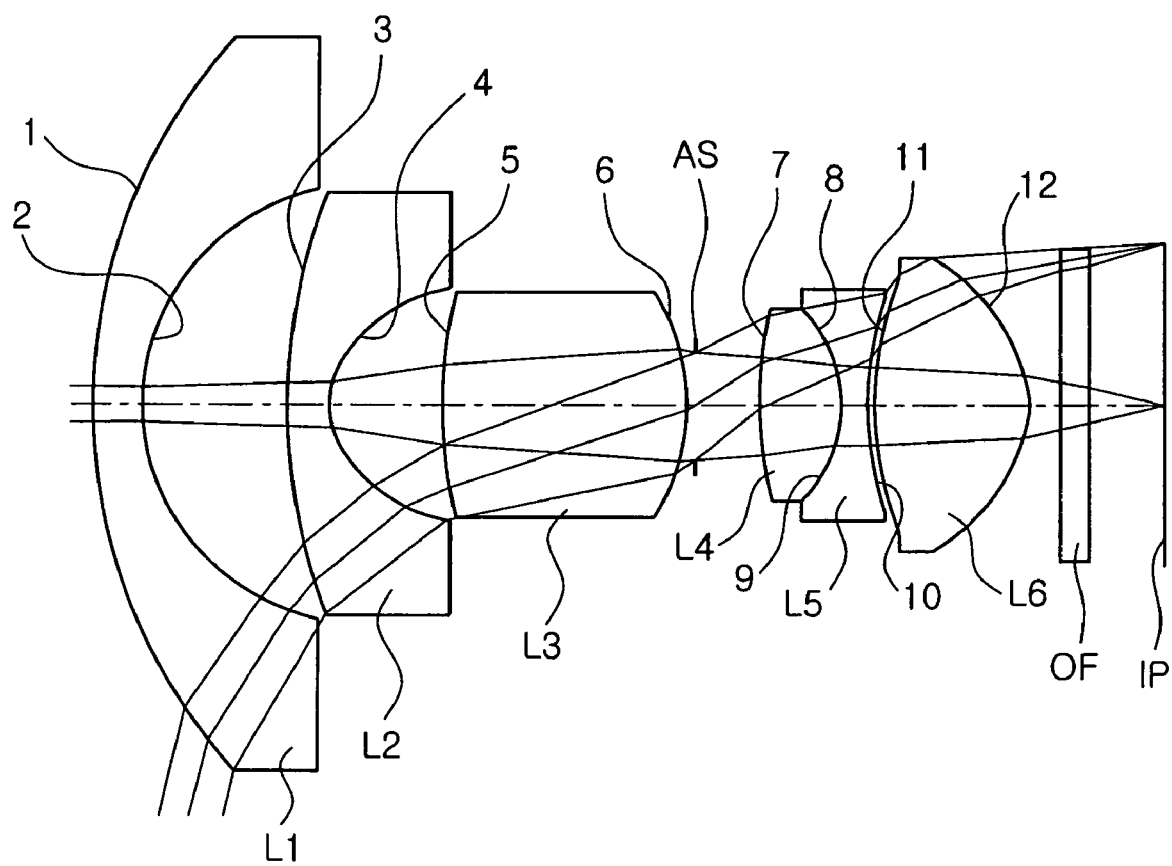
FIG. 3 is a lens configuration view illustrating a super wide angle optical system according to a second embodiment of the invention.
Figure 5:
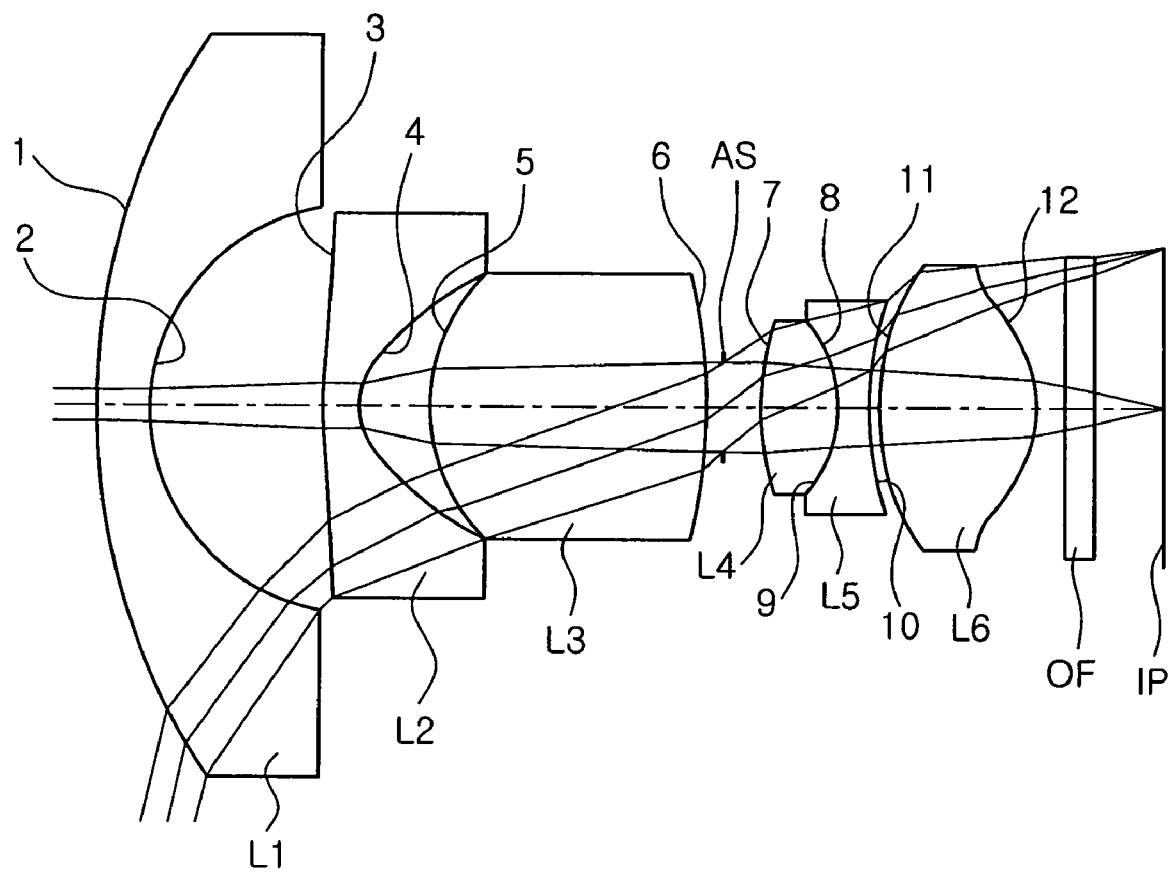
FIG. 5 is a lens configuration view illustrating a super wide angle optical system according to a third embodiment of the invention.

The fourth lens L4 may have a positive refractive power and may have both convex surfaces or a meniscus shape as long as satisfying predetermined conditions which will be described later. According to the first to third embodiments, the fourth lens L4 has a convex object-side surface 7 and a convex image-side surface 8, as shown in FIGS. 1, 3 and 5. According to the fourth embodiment, the fourth lens L4 has a meniscus shape with a convex object-side surface (refer to FIG. 7).

The fifth lens L5 constitutes a lens group together with the fourth lens L4. The fourth lens L4 and the fifth lens L5 may be cemented together or spaced apart from each other at a predetermined distance.

That is, the image-side surface 8 of the fourth lens L4 may be cemented to an object-side surface 9 of the fifth lens L5.

Figure 7:
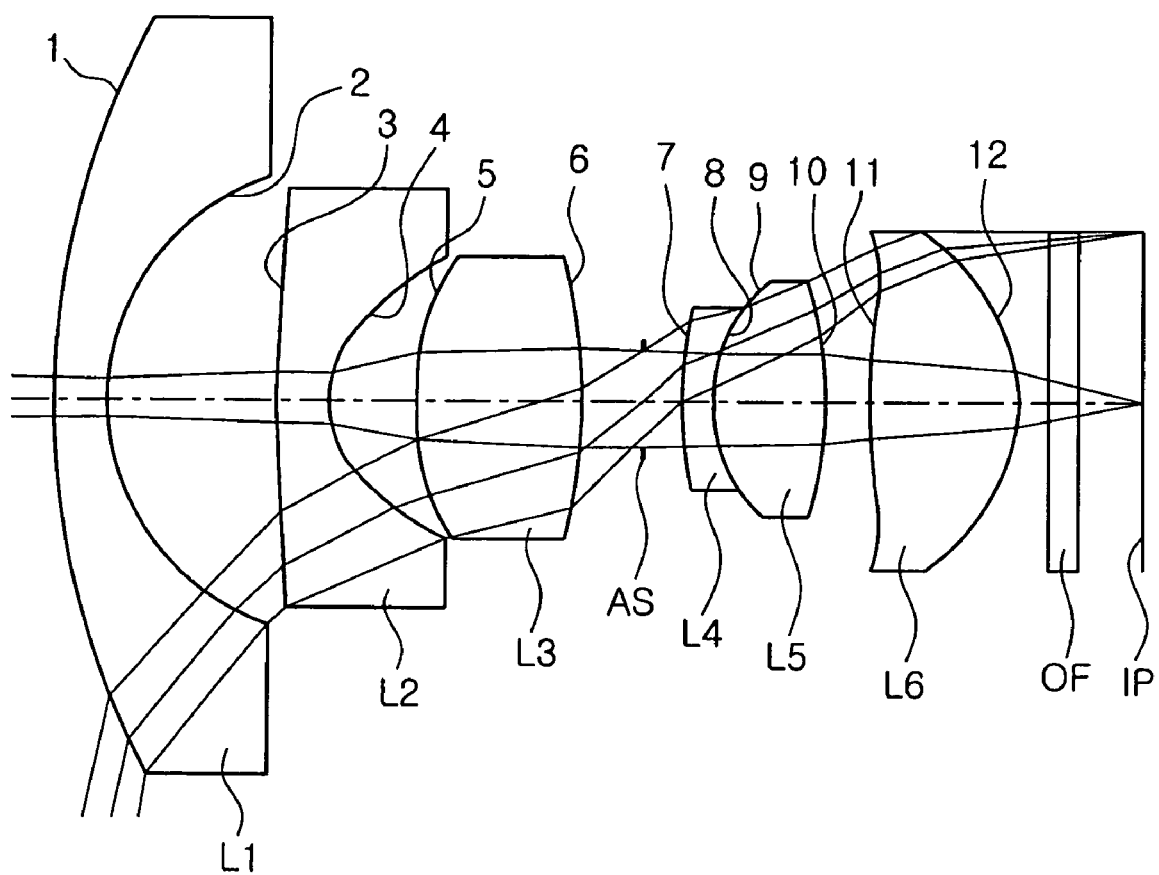
FIG. 7 is a lens configuration view illustrating a super wide angle optical system according to a fourth embodiment of the invention.

The fifth lens L5 may have a negative refractive power and have both convex surfaces and a meniscus shape as long as satisfying the predetermined conditions which will be described later. According to the first to third embodiments, the fifth lens L5 has a concave object-side surface 9 and a concave image-side surface 10, as shown in FIGS. 1, 3 and 5. According to the fourth embodiment, the fifth lens L5 has a convex object-side surface 9 and a convex image-side surface 10, as shown in FIG. 7.

The sixth lens L6 has a positive refractive power and may have a convex object-side surface 11 and a convex image-side surface 12.

Also, an aperture stop AS may be disposed between the third lens L3 and the fourth lens L4 to adjust light amount.

Meanwhile, at least one of the first and second lenses L1 and L2 has at least one of both surfaces formed of an aspherical surface. The sixth lens L6 may have at least one of both surfaces formed of an aspherical surface.

In the super wide angle optical system of each of the present embodiments, both surfaces of the second lens L2 and both surfaces of the sixth lens L6 are illustrated to be formed of an aspherical surface.

As described above, each of the lenses is disposed in view of a refractive power thereof and some lenses include an aspherical surface. Accordingly, this allows for easy correction of various aberrations and leads to much superior optical properties.

That is, the lenses having negative refractive powers and the lenses having positive refractive powers are adequately arranged to correct chromatic aberration and achieve high resolution. Particularly, at least one of the first lens L1 and the second lens L2, and the sixth lens are formed of an aspherical lens. This enhances resolution of the lenses and reduces various aberrations such as spherical aberration, thereby producing a compact optical system superior in optical properties.

Moreover, in a case where some lenses include an aspherical refractive surface, this aspherical lens may be formed of a plastic material to be easily manufactured.

As described above, the lens, when formed of plastics, ensures better machinability, lighter weight and less manufacturing costs.

Furthermore, the first and second lenses L1 and L2 each having a negative refractive power and the third lens L3 having a positive refractive power are sequentially disposed. Then, the fourth lens L4 having a positive refractive power, the fifth lens L5 having a negative refractive power and the sixth lens L6 having a positive refractive power are sequentially disposed. These lenses are adequately configured to have a meniscus shape and an aspherical surface. This allows light incident at a large angle of view to be refracted appropriately to thereby minimize distortion of the image.

Moreover, the super wide angle optical system of the present embodiment may be configured to satisfy following conditions in addition to the above characteristics.

First, the super wide angle optical system of the first embodiment may satisfy following condition 1:

$$3.5 < \theta d/TL < 8.0 \qquad \text{condition 1,}$$

where θd is a maximum half angle of view of the optical system, and TL is a distance from an object-side surface of a lens closest to the object side to an image plane.

The angle of view denotes an angle of an imagable range with respect to a center of the lens, and the half angle of view denotes a half angle of the angle of view and an angle with respect to a short axis passing through the center of the lens. The unit of θd is degree and the unit of TL is mm.

Condition 1 prescribes an angle of view of light and a length of the optical system. Deviation from the lower limit decreases the angle of view and increases length of the optical system, thereby hardly assuring broad image data, which is the original aim of the present invention. Meanwhile, deviation from the upper limit shortens length of the optical system excessively, thereby hardly attaining image with desired resolution.

Meanwhile, the super wide angle optical system according to another exemplary embodiment of the invention may satisfy following condition 2 alone or in conjunction with the condition 1.

$$0.35 < Yd/(f*\tan \theta d) < 0.60 \qquad \text{condition 2,}$$

where Yd is the maximum height of image, f is a focal length of the optical system, and θd is the maximum half angle of view of the optical system.

The height of image denotes a height of an image imaged on an image plane and the unit thereof is mm. The unit of a focal length f is also mm, and the unit of the maximum angle of view θd is degree.

The condition 2 governs a degree of distortion at a wide angle of view. Deviation from the lower limit increases length of the optical system, thereby hindering performance of the optical system at a wide angle of view. Deviation from the upper limit increases distortion of the optical system to aggravate distortion of the image.

Meanwhile, the super wide angle optical system according to still another exemplary embodiment of the invention may satisfy following condition 3 alone or in conjunction with at least one of the conditions 1 and 2.

$$-2.10 < fp/fm < -0.70 \qquad \text{condition 3,}$$

where fp is a focal length of a lens having an aspherical surface and a positive refractive power, and fm is a focal length of a lens having an aspherical surface and a negative refractive power.

More specifically, fp may be a focal length of the sixth lens L6 which may be formed of an aspherical surface, out of the third lens L3, fourth lens L4 and sixth lens L6 each having a positive refractive power. fm may be a focal length of the first lens L1 or second lens L2, or a combined focal length of the first and second lenses L1 and L2 which may include an aspherical surface, out of the first, second and fifth lenses L1, L2 and L5 each having a negative refractive power.

The condition 3 governs balance of the refractive power of a plastic aspherical lens. Deviation from the lower limit or the upper limit breaks balance of the refractive power of the lenses, that is, between the lens having a positive refractive power and the lens having a negative refractive power. Such a deviation also causes the image plane to be moved excessively in response to temperature change to thereby degrade resolution at a fixed focal length.

Meanwhile, the super wide angle optical system according to yet another exemplary embodiment of the invention may satisfy following condition 4 alone or in conjunction with at least one of conditions 1 to 3.

$$2.0 < ff/fs < 3.8 \qquad \text{condition 4,}$$

where ff is a focal length of a lens closest to the object side, and fs is a focal length of a lens closest to an image side of the lens closest to the object side.

In the embodiments shown in each drawing of the present invention, the first lens L1 to sixth lens L6 are sequentially disposed from an object side to an image side. Thus, ff may be a focal length of the first lens L1 and fs may be a focal length of the second lens L2. Therefore, condition 4 is expressed as follows.

$$2.0 < f1/f2 < 3.8 \qquad \text{condition 4,}$$

Condition 4 prescribes a ratio of refractive powers between the first and second lenses L1 and L2, i.e., lenses disposed at the object side and having negative refractive powers. Deviation from the lower limit increases the refractive power of the first lens L1 and decreases curvature, hindering the manufacture of the optical system. Deviation from the upper limit increases the refractive power of the second lens L2 and decreases curvature, also hindering the manufacture of the optical system.

Meanwhile, the super wide angle optical system according to a further embodiment of the invention may satisfy following condition 5 along or in conjunction with at least one of the conditions 1 to 4.

$$-5.0 < fr/Rr < -0.9 \qquad \text{condition 5,}$$

where fr is a focal length of a lens closest to an image side, Rr is a radius of curvature of the image-side surface of the lens closest to the image side.

In the embodiment shown in each drawing of the present invention, the first to sixth lenses 1 L1 to L6 are sequentially disposed from the object side to the image side. Thus, fr may be a focal length of the sixth lens L6 and Rr may be a radius of curvature of the image-side surface 12 of the sixth lens L6. Therefore, condition 5 may be expressed as follows.

$$-5.0 < f6/Rr6 < -0.9 \qquad \text{condition 5,}$$

The condition 5 governs a ratio between a focal length of the lens closest to the image side and a radius of curvature. Deviation from the lower limit or the upper limit deteriorates resolution at peripheral portions of the image plane and renders field curvature aberration hardly correctable.

Hereinafter, the super wide angle optical system of the present invention will be described in detail by way of more detailed examples. Detailed numeral values will be applied to the first embodiment shown in FIG. 1, the second embodiment shown in FIG. 3, the third embodiment shown in FIG. 5, and the fourth embodiment shown in FIG. 7.

The aspherical surfaces used in each of following embodiments are obtained by following known Equation 1, in which 'E and a number following the E' used in conic constants K and aspherical coefficients A, B, C, D and E represent a 10's power. For example, E+01 and E−02 represent $10^1$ and $10^{-2}$, respectively.

$$Z = \frac{cY^2}{1 + \sqrt{1 - (1+K)c^2Y^2}} + AY^4 + BY^6 + CY^8 + DY^{10} + EY^{12} + FY^{14} + \ldots, \qquad \text{Equation 1}$$

where Z is a distance toward an optical axis from a vertex of a lens, Y is a distance toward a direction perpendicular to an optical axis, c is a radius of curvature on a vertex of a lens, K is a conic constant and A, B, C, D and E are aspherical coefficients.

First Embodiment

Table 1 below shows numeral examples of the first embodiment of the present invention.

In the first embodiment of FIG. 1, an effective focal length is 1.05 mm, a back focal length (BFL) is 1.83 mm, an F-number is 2.0, a total length (TL) is 14.69 mm and an angle of view is 154 degrees.

Also, a focal length f1 of the first lens L1 is −7.19 mm, a focal length f2 of the second lens L2 is −2.12 mm, a focal length f3 of the third lens L3 is 3.36 mm, a focal length f4 of the fourth lens L4 is 24.94 mm, a focal length f5 of the fifth lens L5 is −4.77 mm, and a focal length f6 of the sixth lens L6 is 2.43 mm.

Moreover, in this embodiment, as shown in FIG. 1, the fourth lens L4 has both convex surfaces and the fifth lens L5 has both concave surfaces.

TABLE 1

| Sur. | R | d | nd | vd |
|---|---|---|---|---|
| 1 | 8.646 | 0.700 | 1.744 | 44.8 |
| 2 | 3.200 | 2.300 | | |
| 3 | 32.902 | 0.700 | 1.531 | 56.0 |
| 4 | 1.087 | 1.391 | | |
| 5 | 2.920 | 3.460 | 1.741 | 27.7 |
| 6 | −8.731 | 0.100 | | |
| AS | ∞ | 0.481 | | |
| 7 | 3.643 | 1.200 | 1.620 | 60.3 |
| 8 | −2.100 | 0.400 | | |
| 9 | −2.100 | 0.400 | 1.847 | 23.7 |
| 10 | 8.832 | 0.150 | | |
| 11 | 2.956 | 1.980 | 1.531 | 56.0 |
| 12 | −1.773 | 0.400 | | |
| 13 | ∞ | 0.400 | 1.517 | 64.1 |
| 14 | ∞ | 1.031 | | |

Here, Sur. denotes a surface number of each of the lenses, AS denotes an aperture stop, and surface numbers 13 and 14 denote an object-side surface and an image-side surface of the optical filter, respectively.

Also, R denotes a radius of curvature of each surface of the each lens, d denotes a thickness of the lens, a distance between the lenses or a distance between a corresponding one of the lenses and the image (or the object). nd denotes a refractive index of the each lens and vd denotes an Abbe number of the each lens.

The aforesaid conditions satisfy following values when the numerical values are applied.
    condition 1: 5.24076691
    condition 2: 0.51450691
    condition 3: −1.1462264
    condition 4: 3.39150943
    condition 5: −1.3702956

Meanwhile, in the first embodiment, the object-side surface 3 and the image-side surface 4 of the second lens L2 are aspherical. Also, the object-side surface 11 and the image-side surface 12 of the sixth lens L6 are aspherical. Aspherical coefficients of the first embodiment according to the Equation 1 are noted in Table 2 below.

TABLE 2

| | Sur. 3 | Sur. 4 | Sur. 11 | Sur. 12 |
|---|---|---|---|---|
| K | 78.959306 | −0.947448 | −9.167869 | −0.8708 |
| A | 5.016E−03 | 3.515E−03 | −7.215E−04 | 2.502E−02 |
| B | −8.938E−04 | 1.527E−02 | 4.205E−03 | −2.830E−03 |
| C | 5.138E−05 | −5.911E−03 | −5.847E−04 | 1.269E−03 |
| D | −1.417E−06 | 5.726E−04 | 6.447E−05 | −3.030E−06 |

Figures 2A, 2B, 2C:
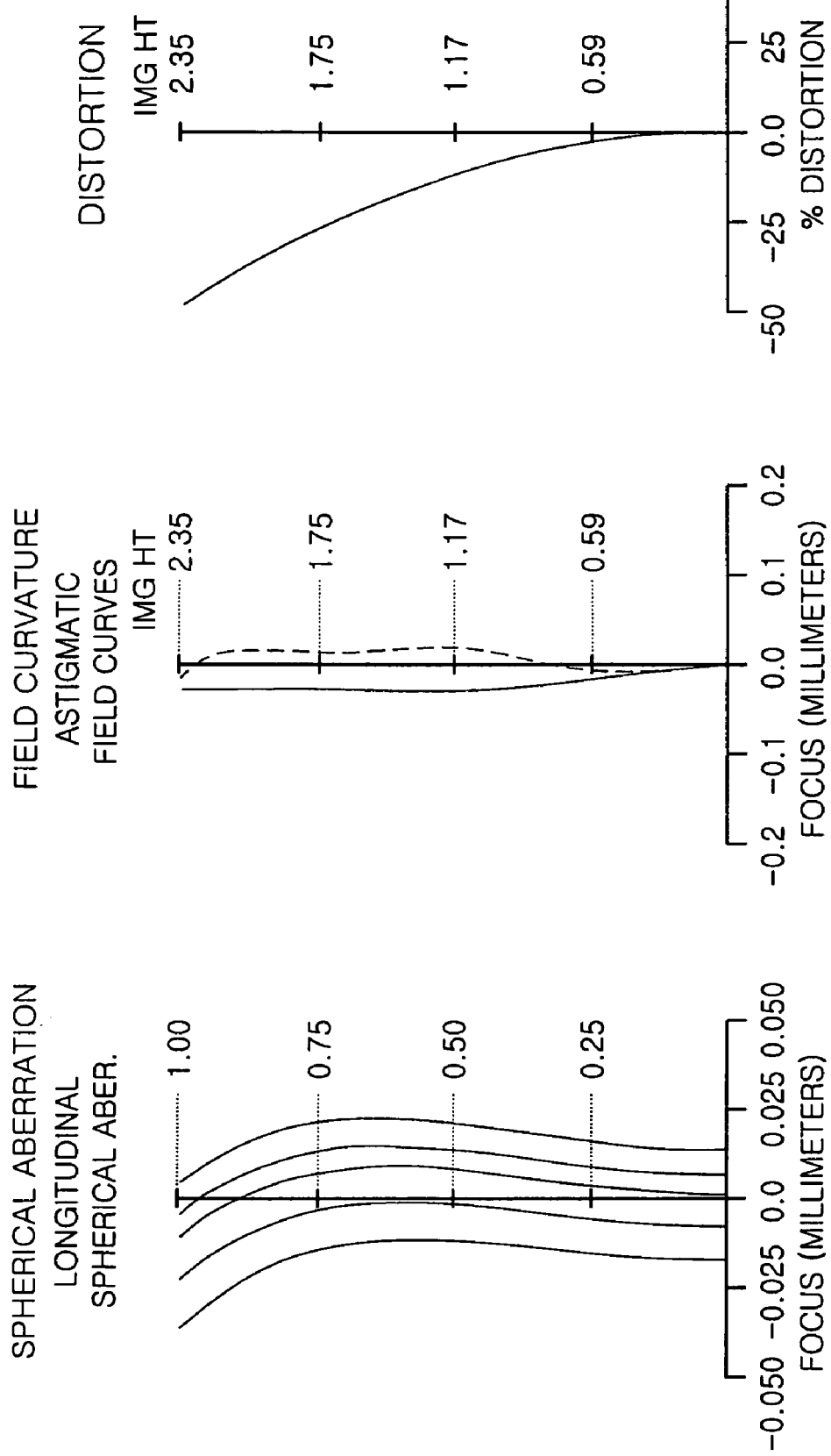

FIGS. 2A to 2C are aberrational graphs of the super wide angle optical system, in which FIG. 2B represents spherical aberration, FIG. 2B represents field curvature aberration and FIG. 2C represents distortion.

Second embodiment

Table 3 below shows numeral examples of the second embodiment of the present invention.

In the second embodiment of FIG. 3, an effective focal length is 1.05 mm, a back focal length (BFL) is 1.87 mm, an F-number is 2.0, a total length (TL) is 15.02 mm and an angle of view is 154 degrees.

Also, a focal length f1 of the first lens L1 is −7.9 mm, a focal length f2 of the second lens L2 is −2.61, a focal length f3 of the third lens L3 is 3.58 mm, a focal length f4 of the fourth lens L4 is 61.84 mm, a focal length f5 of the fifth lens L5 is −3.52, and a focal length f6 of the sixth lens L6 is 2.3 mm.

Moreover, in this embodiment, as shown in FIG. 3, the fourth lens L4 has both convex surfaces and the fifth lens L5 has both concave surfaces.

TABLE 3

| Sur. | R | d | nd | vd |
|---|---|---|---|---|
| 1 | 8.000 | 0.700 | 1.744 | 44.8 |
| 2 | 3.272 | 2.000 | | |
| 3 | 14.434 | 0.550 | 1.531 | 56.0 |
| 4 | 1.253 | 1.621 | | |
| 5 | 6.030 | 3.467 | 1.673 | 32.1 |
| 6 | −3.124 | 0.100 | | |
| AS | ∞ | 0.896 | | |
| 7 | 4.610 | 1.136 | 1.620 | 60.3 |
| 8 | −2.000 | 0.400 | | |
| 9 | −2.000 | 0.400 | 1.847 | 23.7 |
| 10 | 5.205 | 0.100 | | |
| 11 | 3.661 | 2.180 | 1.531 | 56.0 |
| 12 | −1.464 | 0.400 | | |
| 13 | ∞ | 0.400 | 1.517 | 64.1 |
| 14 | ∞ | 1.073 | | |

Here, Sur., R, d, nd, and vd are the same as described in the first embodiment and thus will not be described in detail.

The aforesaid conditions satisfy following values when the numerical values are applied.
    condition 1: 5.12546411
    condition 2: 0.51450691
    condition 3: −0.8812261
    condition 4: 3.02681992
    condition 5: −1.5708075

Meanwhile, in the second embodiment, the object-side surface 3 and the image-side surface 4 of the second lens L2 are aspherical. Also, the object-side surface 11 and the image-side surface 12 of the sixth lens L6 are aspherical. Aspherical coefficients of the second embodiment according to the Equation 1 are noted in Table 4 below.

TABLE 4

| | Sur. 3 | Sur. 4 | Sur. 11 | Sur. 12 |
|---|---|---|---|---|
| K | 17.3482289 | −0.819678 | −7.8144486 | −0.8628619 |
| A | 5.784E−03 | 1.058E−02 | −1.024E−02 | 3.431E−02 |
| B | −6.237E−04 | 1.796E−02 | 2.796E−03 | −9.026E−03 |
| C | 4.090E−05 | −4.540E−03 | −3.415E−04 | 1.621E−03 |
| D | −2.580E−06 | 2.013E−03 | 1.660E−05 | −1.330E−04 |

Figure 4:
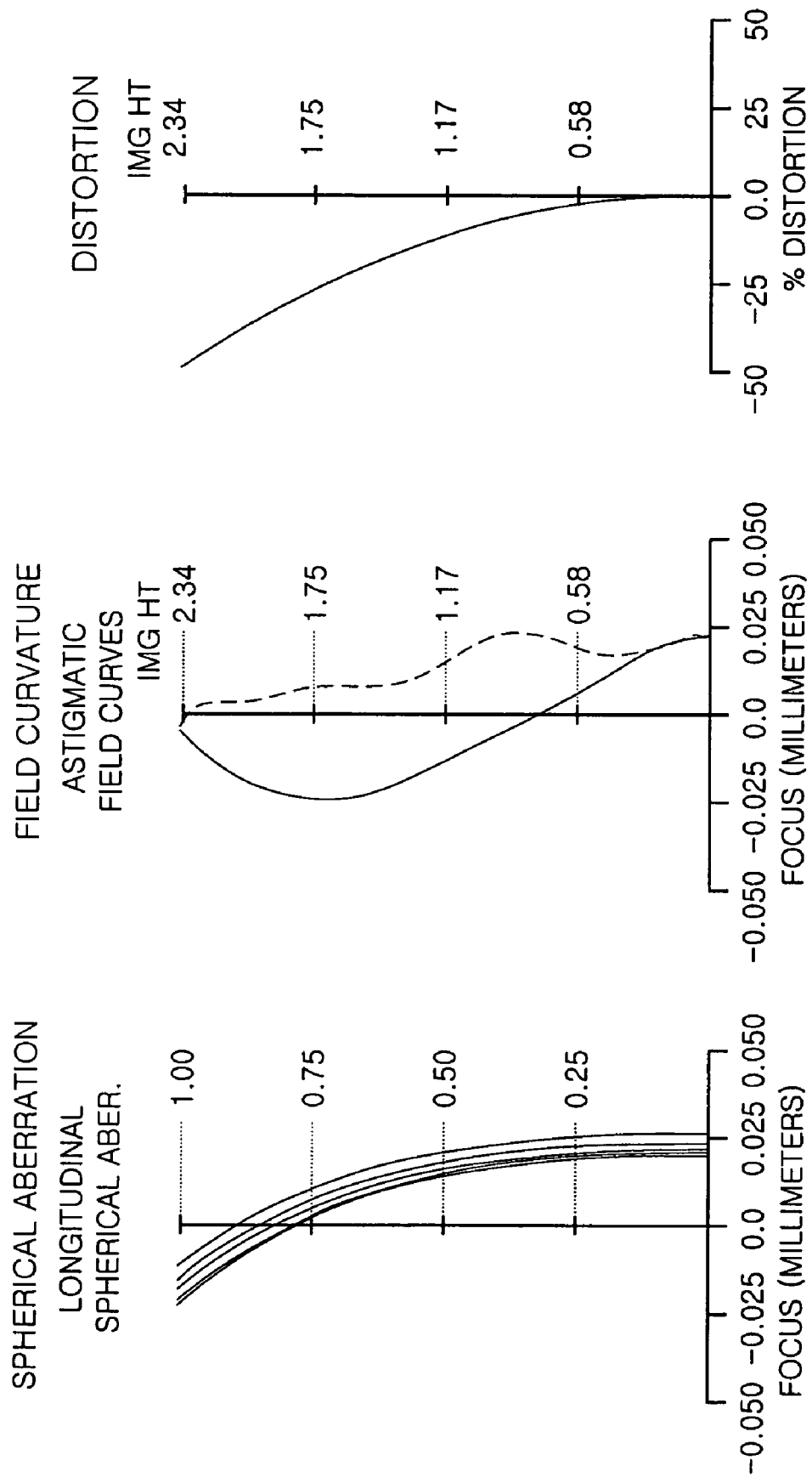

FIGS. 4A to 4C are aberrational graphs of the super wide angle optical system, in which FIG. 4B represents spherical aberration, FIG. 4B represents field curvature aberration and FIG. 4C represents distortion.

Third Embodiment

Table 5 below shows numeral examples of the second embodiment of the present invention.

In the third embodiment of FIG. 5, an effective focal length is 1.04 mm, a back focal length (BFL) is 1.81 mm, an F-number is 2.1, a total length (TL) is 15.31 mm and an angle of view is 156 degrees.

Also, a focal length f1 of the first lens L1 is −6.14 mm, a focal length f2 of the second lens L2 is −2.22, a focal length f3 of the third lens L3 is 3.24 mm, a focal length f4 of the fourth lens L4 is 16.29 mm, a focal length f5 of the fifth lens L5 is −4.76 mm, and a focal length f6 of the sixth lens L6 is 2.31 mm.

Moreover, in this embodiment, as shown in FIG. 5, the fourth lens L4 has both convex surfaces and the fifth lens L5 has both concave surfaces.

TABLE 5

| Sur. | R | d | nd | vd |
|---|---|---|---|---|
| 1 | 10.150 | 0.760 | 1.744 | 44.8 |
| 2 | 3.050 | 2.511 | | |
| 3 | 22.354 | 0.500 | 1.531 | 56.0 |
| 4 | 1.112 | 0.974 | | |
| 5 | 2.706 | 3.983 | 1.755 | 27.5 |
| 6 | −9.381 | 0.233 | | |
| AS | ∞ | 0.555 | | |
| 7 | 3.681 | 1.142 | 1.620 | 60.3 |
| 8 | −1.954 | 0.460 | | |
| 9 | −1.954 | 0.460 | 1.755 | 27.5 |
| 10 | 5.447 | 0.100 | | |
| 11 | 2.829 | 2.282 | 1.531 | 56.0 |
| 12 | −1.556 | 0.400 | | |
| 13 | ∞ | 0.400 | 1.517 | 64.1 |
| 14 | ∞ | 1.005 | | |

Here, Sur., R, d, nd, and vd are the same as described in the first embodiment and thus will not be described in detail.

The aforesaid conditions satisfy following values when the numerical values are applied.
condition 1: 5.09633838
condition 2: 0.47825293
condition 3: −1.0405405
condition 4: 2.76576577
condition 5: −1.4845418

Meanwhile, in the third embodiment, the object-side surface 3 and the image-side surface 4 of the second lens L2 are aspherical. Also, the object-side surface 11 and the image-side surface 12 of the sixth lens L6 are aspherical. Aspherical coefficients of the third embodiment according to the Equation 1 are noted in Table 6 below.

TABLE 6

| | Sur. 3 | Sur. 4 | Sur. 11 | Sur. 12 |
|---|---|---|---|---|
| K | 39.3197983 | −0.9768269 | −9.8000528 | −0.8211891 |
| A | 3.354E−03 | 9.226E−03 | 6.967E−03 | 3.472E−02 |
| B | −1.079E−03 | 1.392E−03 | 6.355E−04 | −4.582E−03 |
| C | 9.582E−05 | −1.330E−03 | −4.851E−05 | 1.153E−03 |
| D | −4.278E−06 | 1.212E−04 | 1.852E−05 | −2.467E−05 |

Figures 6A, 6B, 6C:
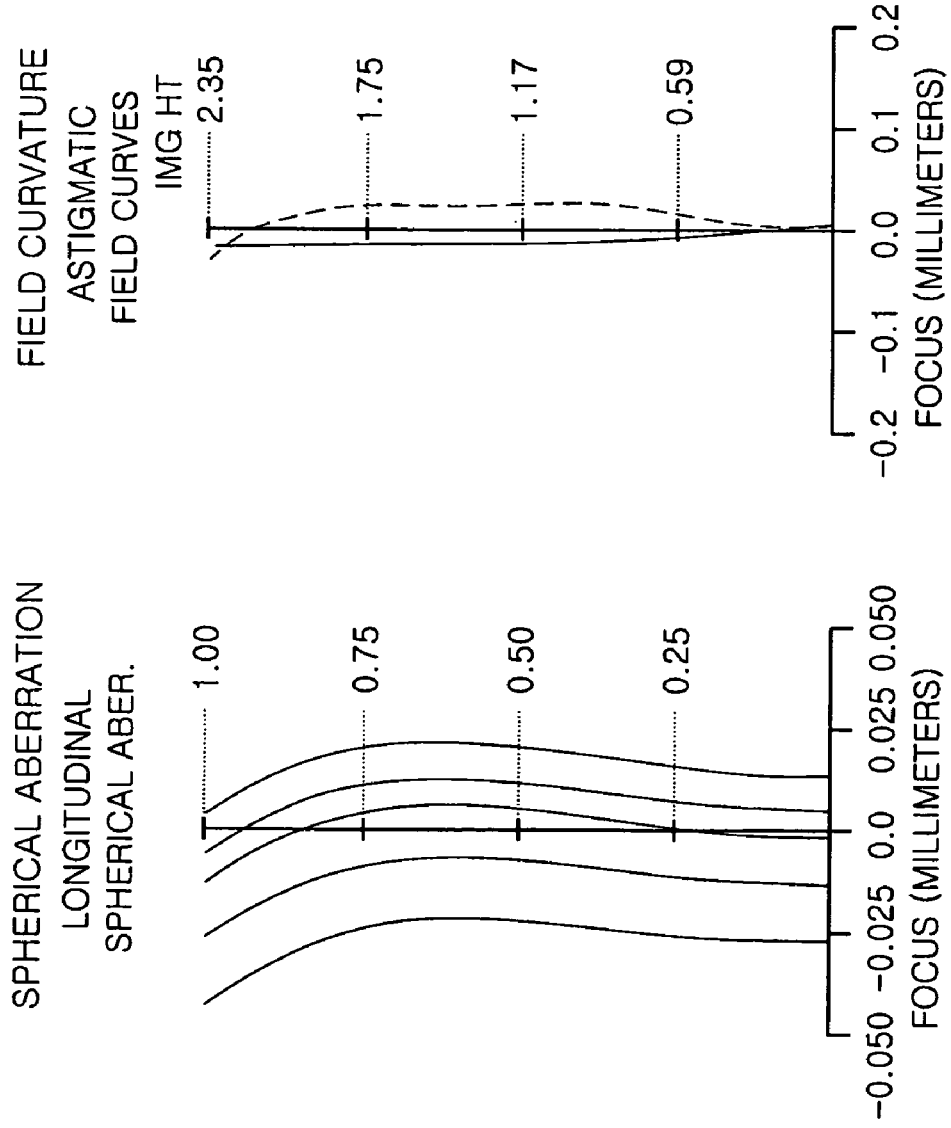

FIGS. 6A to 6C are aberrational graphs of the super wide angle optical system, in which FIG. 6A represents spherical aberration, FIG. 6B represents field curvature aberration and FIG. 6C represents distortion.

Fourth Embodiment

Table 7 below shows numeral examples of the fourth embodiment of the present invention.

In the fourth embodiment of FIG. 7, an effective focal length is 1.05 mm, a back focal length (BFL) is 1.69 mm, an F-number is 2, a total length (TL) is 14.86 mm and an angle of view is 155 degrees.

Also, a focal length f1 of the first lens L1 is −6.57 mm, a focal length f2 of the second lens L2 is −2.36, a focal length f3 of the third lens L3 is 3.35 mm, a focal length f4 of the fourth lens L4 is −3.62 mm, a focal length f5 of the fifth lens L5 is 2.69 mm, and a focal length f6 of the sixth lens L6 is 2.92 mm.

Moreover, in this embodiment, as shown in FIG. 7, the fourth lens L4 has a meniscus shape with a convex object-side surface and the fifth lens L5 has both concave surfaces.

TABLE 7

| Sur. | R | d | nd | vd |
|---|---|---|---|---|
| 1 | 11.412 | 0.700 | 1.744 | 44.8 |
| 2 | 3.343 | 2.300 | | |
| 3 | 30.609 | 0.700 | 1.531 | 56.0 |
| 4 | 1.199 | 1.222 | | |
| 5 | 3.821 | 2.260 | 1.847 | 23.8 |
| 6 | −8.384 | 0.855 | | |
| AS | ∞ | 0.565 | | |
| 7 | 7.083 | 0.400 | 1.847 | 23.8 |
| 8 | 2.100 | 1.511 | | |
| 9 | 2.100 | 1.511 | 1.618 | 63.4 |
| 10 | −5.854 | 0.621 | | |
| 11 | 5.522 | 2.037 | 1.531 | 56.0 |
| 12 | −1.890 | 0.400 | | |
| 13 | ∞ | 0.400 | 1.517 | 64.1 |
| 14 | ∞ | 0.890 | | |

Here, Sur., R, d, nd, and vd are the same as described in the first embodiment and thus will not be described in detail.

The aforesaid conditions satisfy following values when the numerical values are applied.
condition 1: 5.2153432
condition 2: 0.49406305
condition 3: −1.2372881
condition 4: 2.78389831
condition 5: −1.5447714

Meanwhile, in the fourth embodiment, the object-side surface 3 and the image-side surface 4 of the second lens L2 are aspherical. Also, the object-side surface 11 and the image-side surface 12 of the sixth lens L6 are aspherical. Aspherical coefficients of the fourth embodiment according to the Equation 1 are noted in Table 8 below.

TABLE 8

| | Sur. 3 | Sur. 4 | Sur. 11 | Sur. 12 |
|---|---|---|---|---|
| K | 90.4829165 | −1.094634 | −10.590511 | −2.7770963 |
| A | 3.814E−03 | 7.122E−03 | −7.319E−03 | −4.897E−03 |
| B | −9.850E−04 | 5.853E−03 | 1.136E−04 | −5.563E−04 |
| C | 7.891E−05 | −2.522E−03 | −4.727E−04 | −8.650E−05 |
| D | −3.495E−06 | 2.401E−04 | 5.938E−05 | 2.478E−06 |

FIGS. 8A to 8C are aberrational graphs of the super wide angle optical system, in which FIG. 8A represents spherical aberration, FIG. 8B represents field curvature aberration and FIG. 8C represents distortion.

The above embodiments demonstrate the values in the range satisfying the conditions 1 to 5.

As shown in FIGS. 2, 4, 6, and 8, the super wide angle optical system superior in aberrational characteristics can be obtained.

As set forth above, according to exemplary embodiments of the invention, a super wide angle optical system is small in size and light in weight, and exhibits high-definition optical properties, while significantly reduced in distortion by virtue of a wide angle of view. Also, in the optical system, lenses are adequately arranged in view of the refractive power thereof to prevent deterioration in performance at a high temperature due to plastic lenses employed.

While the present invention has been shown and described in connection with the exemplary embodiments, it will be apparent to those skilled in the art that modifications and variations can be made without departing from the spirit and scope of the invention as defined by the appended claims.

What is claimed is:
1. A super wide angle optical system comprising, arranged about an optical axis:

a first lens having a negative refractive power and having a meniscus shape with a convex object-side surface;
a second lens having a negative refractive power and having a meniscus shape with a convex object-side surface;
a third lens having a positive refractive power and having both convex surfaces;
a fourth lens having a positive refractive power;
a fifth lens having a negative refractive power; and
a sixth lens having a positive refractive power, having both convex surfaces, and having at least one aspherical surface formed,
wherein at least one of the first and second lenses has at least one surface formed to have an aspherical surface,
each of the lenses satisfying following conditions 1 and 2:

$$1: 3.5 < \theta d/TL < 8.0 \qquad \text{condition 1,}$$

$$2: 0.35 < Yd/(f*\tan \theta d) < 0.60 \qquad \text{condition 2,}$$

where $\theta d$ is a maximum half angle of view of the optical system and TL is a distance from an object-side surface of a lens closest to the object side to an image plane, Yd is a maximum height of an image, f is a focal length of the optical system, and $\theta d$ is a maximum half angle of a field of view of the optical system, and at least one of the first and second lenses, and the sixth lens satisfying following condition 3:

$$3: -2.10 < fp/fm < -0.70 \qquad \text{condition 3,}$$

where fp is a focal length of a lens having an aspherical surface and a positive refractive power, and fm is a focal length of a lens having an aspherical surface and a negative refractive power.

2. The super wide angle optical system of claim 1, wherein the fourth and fifth lenses form one lens group, the fourth and fifth lenses cemented together or spaced apart from each other at a predetermined distance.

3. The super wide angle optical system of claim 1, further comprising an aperture stop disposed between the third and fourth lenses to adjust light amount.

4. The super wide angle optical system of claim 1, wherein each of the lenses satisfies following condition 4:

$$4: 2.0 < ff/fs < 3.8 \qquad \text{condition 4,}$$

where ff is a focal length of the lens disposed closest to an object side and fs is a focal length of the lens disposed closest to an image side of the lens disposed closest to the object side.

5. The super wide angle optical system of claim 1, wherein each of the lenses satisfies following condition 5:

$$5: -5.0 < fr/Rr < -0.9 \qquad \text{condition 5,}$$

where fr is a focal length of the lens disposed closest to an image side and Rr is a radius of curvature of an image-side surface of the lens disposed closest to the image side.

* * * * *